US011816236B1

(12) United States Patent
Gupta et al.

(10) Patent No.: US 11,816,236 B1
(45) Date of Patent: Nov. 14, 2023

(54) CUSTOMER-CONTROLLED DYNAMIC ATTESTATION-POLICY-BASED REMOTE ATTESTATION OF COMPUTE RESOURCES

(71) Applicant: Amazon Technologies, Inc., Seattle, WA (US)

(72) Inventors: Kuldeep Gupta, Seattle, WA (US); Hina Parveen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 405 days.

(21) Appl. No.: 16/938,131

(22) Filed: Jul. 24, 2020

(51) Int. Cl.
*G06F 21/62* (2013.01)
*G06F 21/44* (2013.01)
*G06F 21/30* (2013.01)
*G06F 16/907* (2019.01)
*G06F 21/57* (2013.01)
*G06N 20/00* (2019.01)

(52) U.S. Cl.
CPC ........ *G06F 21/6218* (2013.01); *G06F 16/907* (2019.01); *G06F 21/305* (2013.01); *G06F 21/44* (2013.01); *G06F 21/57* (2013.01); *G06N 20/00* (2019.01)

(58) Field of Classification Search
CPC .. G06F 21/6218; G06F 16/907; G06F 21/305; G06F 21/44; G06F 21/57; G06N 20/00
USPC .......................................................... 726/22
See application file for complete search history.

(56) References Cited

U.S. PATENT DOCUMENTS

| 2002/0188568 | A1* | 12/2002 | Nickolaisen | ........ G06F 21/6218 705/52 |
| 2007/0179802 | A1* | 8/2007 | Buss | ...................... G06Q 10/06 726/4 |

(Continued)

OTHER PUBLICATIONS

Moe, "Effective Security and Access Control Framework for Multilevel Organizations", 2019, Springer, 99. 267-288 (Year: 2019).*

*Primary Examiner* — Noura Zoubair
*Assistant Examiner* — Gregory A Lane
(74) *Attorney, Agent, or Firm* — Knobbe, Martens, Olson & Bear, LLP

(57) ABSTRACT

Techniques and apparatus for managing remote attestation of infrastructure components based on a customer controlled dynamic attestation policy are described. One technique includes receiving a user-specified configuration for managing remote attestation of infrastructure component(s) hosted in a cloud computing environment. The user-specified configuration indicates information related to managing the life-cycle of the infrastructure component(s). For example, the user-specified configuration can indicate attributes associated with the infrastructure component(s), criteria for validating an attestation policy for the infrastructure component(s), criteria for rotating an attestation policy for the infrastructure component(s), etc. An attestation policy for each infrastructure component is generated, based on the user-specified configuration. The attestation policy for each infrastructure component indicates which of the attributes to use during remote attestation of the infrastructure component. Remote attestation of at least one infrastructure component is performed in accordance with the attestation policy associated with the infrastructure component.

19 Claims, 11 Drawing Sheets

(56) References Cited

U.S. PATENT DOCUMENTS

| | | | |
|---|---|---|---|
| 2011/0088093 A1* | 4/2011 | Kang | G06F 21/567 |
| | | | 726/22 |
| 2016/0350549 A1* | 12/2016 | Hampel | H04L 63/06 |
| 2018/0373881 A1* | 12/2018 | Thom | H04L 9/30 |
| 2019/0258813 A1* | 8/2019 | Lewis | G06F 21/6209 |
| 2020/0084202 A1* | 3/2020 | Smith | H04L 41/5003 |
| 2020/0374700 A1* | 11/2020 | Smith | H04L 63/102 |

* cited by examiner

CUSTOMER-CONTROLLED DYNAMIC ATTESTATION-POLICY-BASED REMOTE ATTESTATION OF COMPUTE RESOURCES

BACKGROUND

The present disclosure relates to cloud computing environments, and more specifically, to techniques for managing and performing remote attestation of computing resources based on a customer-controlled attestation policy.

Computing execution environments (e.g., data centers) provide users and enterprise customers (e.g., organizations, companies, etc.) with a variety of computing services. For example, a data center may provision computing instances (e.g., hardware, virtual server instances, bare-metal instances, etc.) and deploy applications (or workloads) on those computing instances. In another example, a data center can provision relational database instances to handle application workloads, backups, storage, etc.

In some cases, a user (or customer) that has sensitive workloads (e.g., workloads that handle payment data, workloads that handle identity data, etc.) may want to validate the computing execution environment where workloads are going to be executed to ensure that the computing execution environment is secure. Such a computing execution environment could be in a data center managed by the customer (e.g., an on-premises data center) or in a data center managed by a cloud service provider (e.g., a cloud service provider managed data center). In a customer-managed data center, the user has some level of assurance over the execution environment, since the user can specify the computing resources that are utilized for workloads and deploy its own security controls on those computing resources. On the other hand, in a cloud service provider managed data center (or cloud computing environment), the user generally has a limited level of assurance over the execution environment, since the user generally offloads responsibility for launching and maintaining computing instances to a cloud-server provider. In such cloud service provider managed data centers, the user generally has to rely on the cloud service provider for ensuring that the underlying infrastructure hosting the execution environment and the execution environment itself are trusted for running its sensitive workloads.

BRIEF DESCRIPTION OF DRAWINGS

Various embodiments in accordance with the present disclosure will be described with reference to the drawings, where like designations denote like elements.

DETAILED DESCRIPTION

Figure 1:
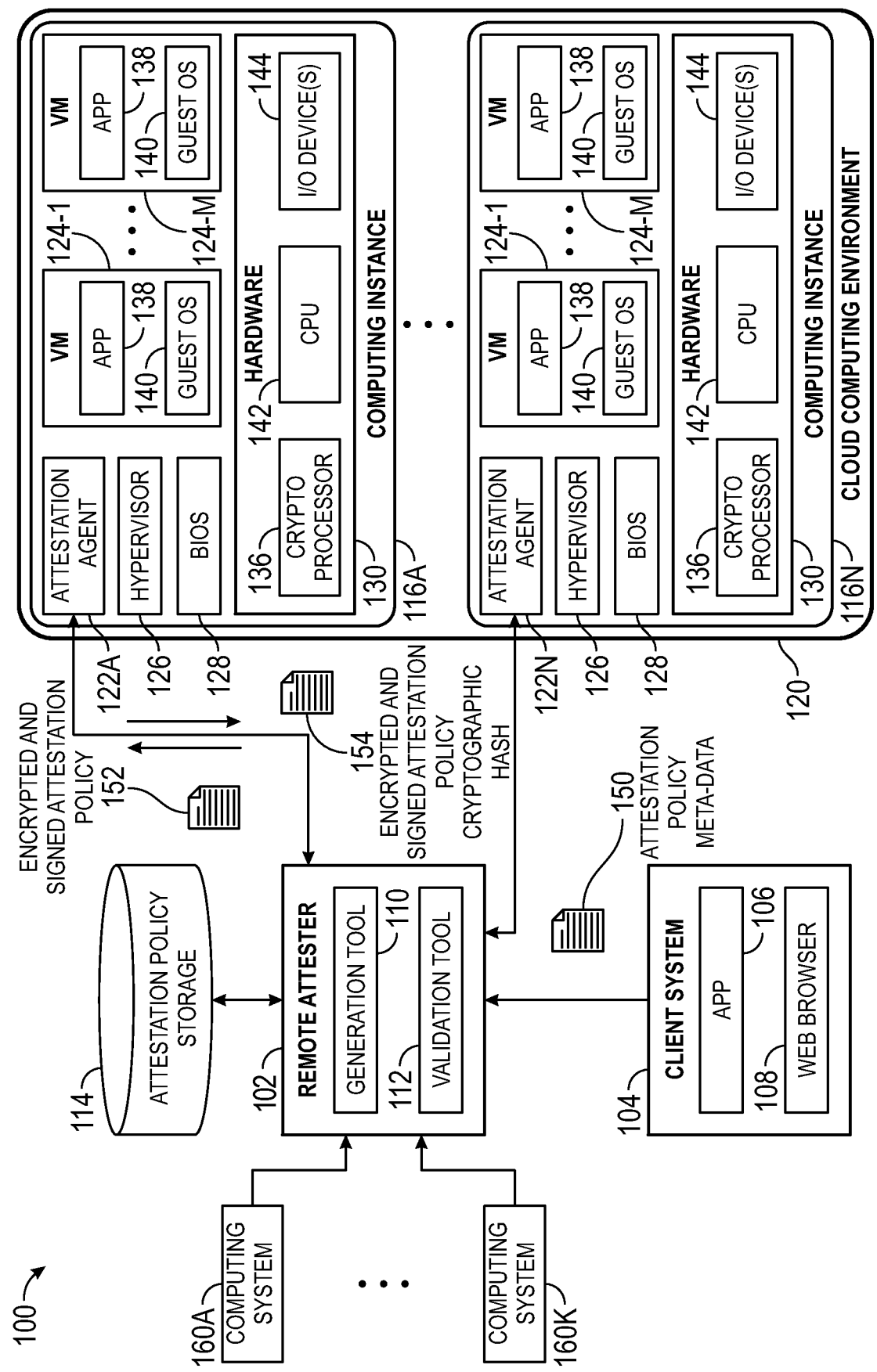
FIG. 1 illustrates an example network architecture for performing remote attestation of computing resources based on a user-controlled attestation policy, according to one embodiment.

In general, a cloud computing user can perform remote attestation to determine a level of trust in a cloud computing environment. Remote attestation generally refers to a method (or technique) in which a cloud host (or attestator) authenticates its computing resources (or infrastructure components) to a remote server (cloud computing user or challenger). A remote attestation protocol generally involves the exchange of security information (e.g., cryptographic keys or hashes) between the cloud host and cloud computing user in order to assure the integrity of the cloud host to the remote server.

The cloud host can use a secure crypto-processor (e.g., trusted platform module (TPM), hardware security module (HSM), etc.) to authenticate compute resources. For example, each crypto-processor (e.g., TPM chip) for a set of infrastructure components may have a unique and secret cryptographic key (e.g., Rivest-Shamir-Adleman (RSA) private key) that is burned in the crypto-processor as it is produced. After an infrastructure component (e.g., processor, database instance, etc.) is provisioned, the cryptographic key for a certificate is bound to the TPM (e.g., becoming a TPM bind key). During a boot process (e.g., secure Unified Extensible Firmware Interface (UEFI) boot process) of an operating system (OS), the TPM can generate a cryptographic hash of a summary of the computing resources on the infrastructure component before they are loaded. These computing resources can include software and firmware components, including but not limited to the Basic Input/Output System (BIOS), boot loader, OS kernel, etc. The generated cryptographic hash allows a cloud computing user to verify the authenticity and integrity of an infrastructure component.

One issue with this process of authenticating infrastructure components is that it gives the cloud computing user limited control over the end-to-end management of the authentication and verification process. For example, the cloud computing user may not have control over how and/or when to generate robust cryptographic hashes to ensure intactness of infrastructure components, how and/or when to validate the cryptographic hashes, how to manage the lifecycle of the cryptographic hashes, how and/or when to use the cryptographic hashes for secure remote attestation, etc.

To address this, embodiments herein describe improved techniques for remote attestation of infrastructure components in a cloud computing environment. More specifically, embodiments describe a remote attestation system that attests infrastructure components based on a user-controlled attestation policy. As used herein, an attestation policy generally outlines a summary of the hardware and software related attributes for a particular infrastructure component (e.g., computing instance, database instance, etc.). For example, assuming the infrastructure component is a computing instance, the summary can include attributes related to central processing unit (CPU) registers, CPU configuration(s), peripheral hardware, BIOS settings, secure boot hashes, disk volumes, hypervisor configurations, host OS configurations/binaries, VM configurations/binaries, software configuration/binaries, etc., for the computing instance.

In some embodiments, a remote attester component (or tool) can generate the attestation policy in accordance with attestation policy metadata (also referred to as a user-specified configuration), which is controlled and configured by the cloud computing user. For example, the attestation policy metadata can specify which attributes to use during computation of the attestation policy and the ordering of the attributes to use during computation of the attestation policy. In another example, the attestation policy metadata can indicate whether the computation of the attestation policy is to be static or dynamic, instance-specific or instance-agnostic, application-specific or application-agnostic within the computing instance, etc. The attestation policy for a given infrastructure component then controls the manner in which that infrastructure component attests resources on the infrastructure component.

For example, once the attestation policy is generated for a particular infrastructure component, the remote attester can provide the attestation policy to the infrastructure component, which can use values of the attributes specified in the attestation policy to generate an attestation policy cryptographic hash unique to that infrastructure component. The infrastructure component can return the attestation policy cryptographic hash to the remote attester, which stores the attestation policy along with the associated attestation policy cryptographic hash. The remote attester can then use the stored attestation policy and attestation policy cryptographic hash to validate the attestation policy for the particular infrastructure component, based on criteria specified in the attestation policy for that infrastructure component.

In this manner, embodiments can limit the infrastructure component's control and cloud service provider's control to computation of the attestation policy cryptographic hash against the specified attestation policy whenever requested by the cloud computing user. The responsibility for the end-to-end management of the attestation policies for the infrastructure components can remain with the cloud computing user.

As used herein, an infrastructure component (also referred to as a computing resource) may refer to a resource hosted in a cloud computing environment, such as a cloud computing instance (also referred to as a virtual server instance), a database instance, a virtual network device, etc. Additionally, while many of the following embodiments use computing instances as reference examples of infrastructure components that may be located in a cloud computing environment, the techniques presented herein can be used to attest any type of resource (e.g., data, applications, servers, operating systems, etc.) in a cloud computing environment. Similarly, while many of the following embodiments use an IaaS as a reference example of a cloud computing environment, the techniques presented herein can be used for other types of cloud computing environments, such as Platform-as-a-Service (PaaS) cloud computing environments, Software-as-a-Service (SaaS) cloud computing environments, Desktop-as-a-Service (DaaS) cloud computing environments, Disaster recovery-as-a-Service (DRaaS) cloud computing environments, and so on.

FIG. 1 illustrates an example network architecture 100 for performing remote attestation of infrastructure components in a cloud computing environment 120 based on a user controlled attestation policy, according to one embodiment. The network architecture 100 includes a remote attester 102, an attestation policy storage 114, a client system(s) 104, computing systems 160 A-K, and cloud computing environment 120. The client system(s) 104 and computing systems 160 A-K are representative of a variety of computing devices, including, for example, a desktop computer, a laptop computer, a mobile computer (e.g., a tablet or a smartphone), etc. Although not shown, the client system(s) 104 and the computing systems 160 A-K may connect to the cloud computing environment 120 via another network (e.g., the Internet).

The client system 104 is generally configured to host applications used to access the cloud computing environment 120. Here, the client system 104 includes an application (also referred to as an app) 106 and a web browser 108. The application 106 is representative of a component of a client server application (or other distributed application) which can communicate with the cloud computing environment 120. Application 106 may be a "thin" client where the processing is largely directed by the application 106, but performed by computing systems of the cloud computing environment 120 or a conventional software application installed on the computing system 120. The web browser 108 can also be used to access the cloud computing environment 120.

The cloud computing environment 120 may provide various infrastructure components for executing one or more workloads from users. The cloud computing environment 120 generally represents an IaaS provider setting that offers IaaS services to a cloud computing user (e.g., an enterprise, individual, small organization, etc.). Here, for example, the cloud computing environment 120 includes multiple computing instances 116 A-N (representative of infrastructure components), which are available for executing workloads. Each computing instance 116 A-N is configured with a respective attestation agent 122 A-N. Each attestation agent 122 is generally configured to implement one or more techniques described herein for attesting resources on their computing instance 116, based on an attestation policy generated for the computing instance 116. The attestation agent 122 is described in more detail below.

The computing instance(s) 116 may host one or more virtual and physical computing resources. Here, for example, each computing instance 116 includes one or more virtual machines 124 1-M, a hypervisor 126, a BIOS 128, and hardware 130. Hardware 130 includes a secure cryptoprocessor 136, a CPU(s) 142, and I/O devices 144. Each virtual machine (VM) 124 includes a guest OS 140 and can execute one or more applications 138. The hypervisor 126 is generally responsible for running and managing the virtual machines 124. For example, the hypervisor 126 can allocate virtualized hardware resources (from hardware 130) to the virtual machine(s) 124. BIOS 128 is generally firmware that performs hardware initialization during the booting process. The BIOS 128 can provide runtime services for the OS(s) and workloads executing on the computing instance 116.

The secure crypto-processor 136 is generally used to authenticate computing resources of the computing instance 116. For example, the secure crypto-processor 136 may include a secret cryptographic key (e.g., RSA key) that is burned in when the secure crypto- processor 136 is produced. The secure crypto-processor 136 for a particular computing instance 116 can generate a cryptographic hash specific to the computing instance 116. For example, the secure crypto-processor 136 can use a TPM (not shown) and/or HSM (not shown) to hash configuration data (e.g., summary of the hardware and software configuration) for that computing instance. The secure crypto-processor 136 can use a variety of hashing functions to hash the configuration data, including, but not limited to, MD5, SHA, etc.

In one embodiment, the remote attester 102 is configured to receive attestation policy metadata 150 from a cloud computing user, via the client system 104. The remote attester 102 includes a generation tool 110 and a validation tool 112, each of which may include software components, hardware components, or combinations thereof. The attestation policy metadata 150 can specify, for each computing instance 116, the manner in which an attestation policy 152 for the computing instance 116 should be generated (e.g., by the remote attester 102). For example, the attestation policy metadata 150 can include, but is not limited to, an attribute set, an attestation policy type, an attestation policy rotation scheme, an attestation policy validation scheme, etc. The attribute set may include hardware and software related attributes associated with the infrastructure component. In the embodiment depicted in FIG. 1, for example, such attributes for a computing instance can include, CPU registers, CPU configurations, peripheral hardware, BIOS settings, secure boot hashes, disk volumes, hypervisor configurations, host OS configurations/binaries, VM configurations/binaries, software configuration/binaries, etc.

The attestation policy type can indicate the manner for using the attribute set to generate an attestation policy 152 at run-time. For example, the attestation policy type can be set to "ALL," indicating that all of the attributes in the attribute set should be used for generating an attestation policy 152. In another example, the attestation policy type can be set to "RANDOMIZED," indicating that any number of attributes from the attribute set can be randomly selected at run-time to use for generating an attestation policy 152. In yet another example, the attestation policy type can be set to "AUTO," indicating that a (trained) machine learning model should be used to select the set of attributes (from the attribute set) for generating the attestation policy 152 at run-time.

The attestation policy rotation scheme can indicate the frequency for changing (or updating) the attestation policy 152 for each computing instance 116. In one example, the attestation policy rotation scheme can indicate a periodic rotation scheme (e.g., hourly, daily, etc.). In another example, the attestation policy rotation scheme can indicate that the rotation should be performed based on a trigger (e.g., a predetermined condition/criteria is satisfied, such as indication of a security breach). In some cases, switching an attestation policy 152 for a given computing instance 116 can add an additional layer of security by rendering the previous attestation policy and corresponding attestation policy cryptographic hash invalid. Additionally, in some embodiments, different attestation policy rotation schemes can be used for different computing instances 116 to provide an additional layer of security.

The attestation policy validation scheme can indicate when an attestation policy 152 for a given computing instance 116 should be validated by the remote attester 102, e.g., by validating the attestation policy cryptographic hash 154 for the computing instance 116. In one example, the attestation policy validation scheme can indicate that validation should be performed periodically (e.g., hourly, daily, etc.). In another example, the attestation policy validation scheme can indicate that validation should be performed upon occurrence of a predetermined condition/criteria (e.g., code deployment, patch deployment, incoming application processing request, randomly selected incoming requests over a certain period of time, etc.). In one embodiment, different attestation policy validation schemes can be used for different computing instances 116.

In one embodiment, upon receiving attestation policy metadata 150 configured by a cloud computing user, the remote attester 102 (via the generation tool 110) generates an attestation policy 152 for each computing instance 116, based on the attestation policy metadata 150. In one embodiment, a generated attestation policy 152 for a given computing instance 116 indicates selected attributes (which may be in an ordered manner) that should be used to generate an attestation policy cryptographic hash 154 for that computing instance 116. As noted, in some embodiments, the generated attestation policy 152 for a given computing instance 116 can have a dynamically generated instance-specific rotation scheme and/or an instance-specific validation scheme at run-time, e.g., depending on the configured attestation policy metadata 150. The remote attester 102 can send the generated attestation policy 152 for each computing instance 116 to the attestation agent 122 located on the computing instance 116. In one embodiment, the remote attester 102 encrypts the attestation policy 152 (e.g., using a RSA key) and uses a digital certificate (e.g., issued by a CA) to sign the attestation policy 152 for each computing instance 116.

In one embodiment, the attestation agent 122 on a given computing instance 116 receives the encrypted and signed attestation policy 152 and verifies the signature. Once verified, the attestation agent 122 computes an attestation policy cryptographic hash 154, based on the attestation policy 152. For example, the attestation agent 122 can determine values of the attributes specified in the attestation policy 152 on its computing instance 116 and compute the attestation policy cryptographic hash 154, based on the attribute values. In one embodiment, the attestation agent 122 can use the secure crypto-processor 136 to encrypt and sign the attestation policy cryptographic hash 154, and send (or return) the encrypted and signed attestation policy cryptographic hash 154 to the remote attester 102. The remote attester 102 may store the attestation policy 152 and its corresponding attestation policy cryptographic hash 154 in a database (also referred to as a data repository, storage location, etc.) (e.g., attestation policy storage 114).

In this manner, embodiments allow a cloud computing user to control the end-to-end management of the authentication of infrastructure components in the cloud computing environment 120 via the attestation policy metadata 150. In some embodiments, the cloud computing user can also control (via the validation tool 112) whether certain computing systems 160 A-K and/or operations are allowed to use its infrastructure components, via the attestation policy metadata 150. As shown in FIG. 1, for example, the remote attester 102 can provide validation of the attestation policies for the computing instance(s) 116 prior to allowing one or more of the computing systems 160 A-K interact with the computing instances 116.

The computing systems 160 A-K may be representative of a variety of systems that can interact with an infrastructure component over the lifecycle of the infrastructure component. For example, one of the computing systems 160 (e.g., computing system 160A) may be used to deploy new code (or software) (e.g., security updates, patches, etc.) on a computing instance 116 (e.g., computing instance 116A). In this example, prior to allowing the computing system deploy new code on the computing instance 116A, the remote attester 102 can validate the current attestation policy 152 and corresponding attestation policy cryptographic hash 154 for the computing instance 116A stored within the attestation policy storage 114.

In another example, one of the computing systems 160 (e.g., computing system 160B) may be used to route incoming requests to a computing instance 116 (e.g., computing instance 116B). In this example, the remote attester 102 may intercept requests from the computing system 160B to a given computing instance 116 and validate the current attestation policy 152 and corresponding attestation policy cryptographic hash 154 stored within the attestation policy storage 114 before passing (or forwarding) the request to the computing instance 116B.

In yet another example, one of the computing systems 160 (e.g., computing system 160C) may be used to allocate (or provision) infrastructure components (e.g., a computing instance 116C) for the cloud computing user within the cloud computing environment 120. In this example, prior to allowing a provisioned infrastructure component (e.g., computing instance 116C) to serve processing requests for the cloud computing user, the remote attester 102 can validate the provisioned infrastructure component, using the techniques described herein.

Note that FIG. 1 depicts a reference example of a network architecture 100 that can be used to implement one or more techniques described herein and that other network configurations can be used. For example, while FIG. 1 uses computing instances as reference examples of infrastructure components, the techniques presented herein can be used for any type of underlying computing environment. For instance, in cases where an infrastructure component is a database instance, the infrastructure component may be an isolated/standalone database environment. The database instance may include a database engine, examples of which include MySQL, MariaDB, PostgreSQL, etc.

Figure 2:
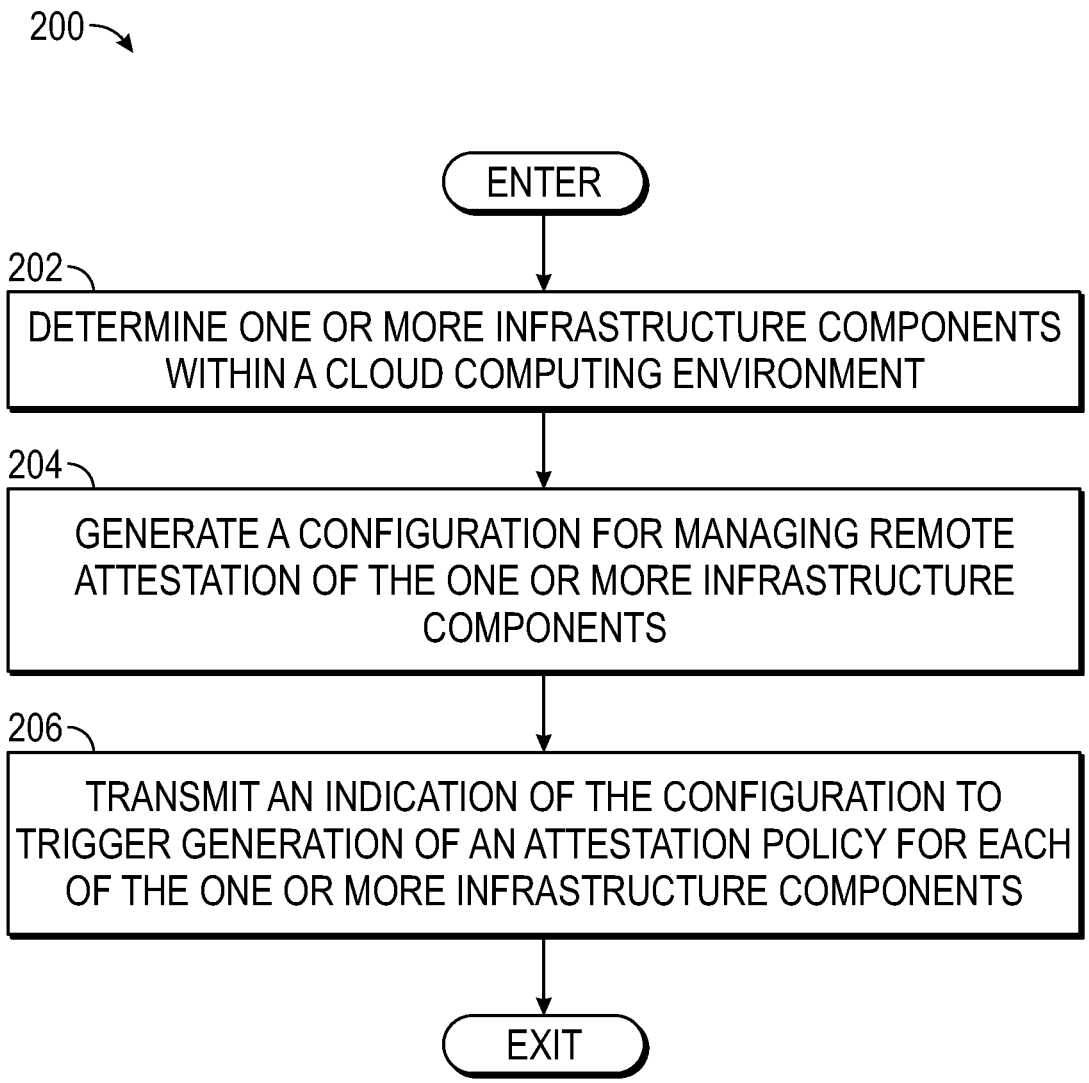
FIG. 2 is a flowchart of a method for managing remote attestation of infrastructure components hosted in a cloud computing environment, according to one embodiment.

FIG. 2 is a flowchart of a method 200 for managing remote attestation of infrastructure components hosted in a cloud computing environment, according to one embodiment. The method 200 may be performed by a cloud computing user, e.g., via one or more components (e.g., application 106, web browser 108) of a client system (e.g., client system 104).

Method 200 may enter at block 202, where the cloud computing user determines one or more infrastructure components (e.g., computing instances 116 A-N) within a cloud computing environment (e.g., cloud computing environment 120). For example, the application 106 may provide an application programming interface (API) and/or use a software development kit (SDK) that allows the cloud computing user to access the cloud computing environment to determine which infrastructure components are allocated (e.g., provisioned and/or activated infrastructure components) to the cloud computing user. In some cases, the application 106 may enable the cloud computing user to view software and/or hardware related attributes of the infrastructure components.

Figure 4:
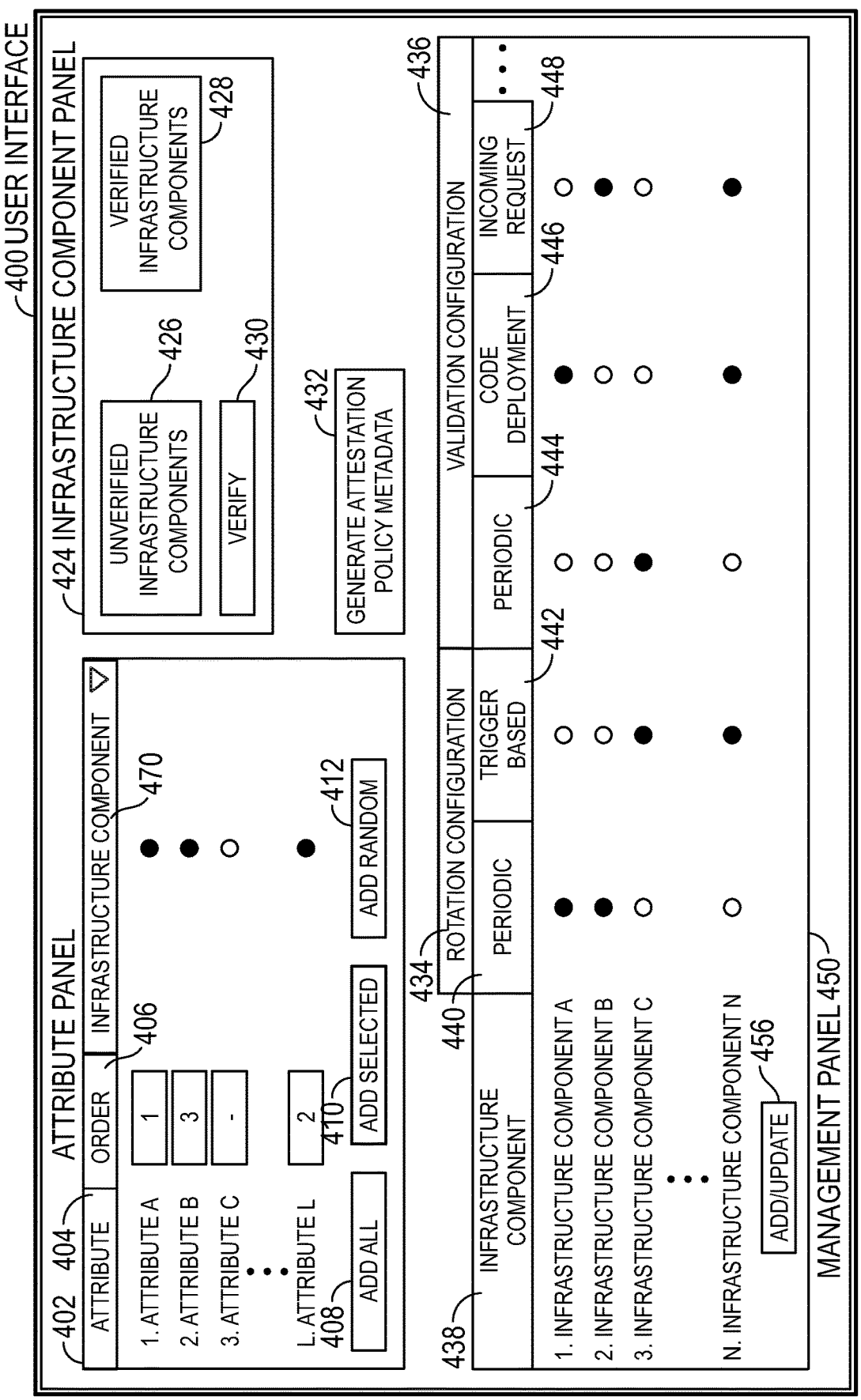
FIG. 4 illustrates an example user interface for managing remote attestation of infrastructure components hosted in a cloud computing environment, according to one embodiment.

As shown in the user interface 400 depicted in FIG. 4, for example, the cloud computing user can view the verified infrastructure components within the cloud computing environment 120 and attributes associated with the verified infrastructure components via the verified infrastructure components window 428 of the infrastructure component panel 424. Similarly, the cloud computing user can view the unverified (unattested) infrastructure components within the cloud computing environment 120 and attributes associated with the unverified infrastructure components via the unverified infrastructure components window 426 of the infrastructure component panel 424. As noted above, the unverified infrastructure components may include one or more newly provisioned infrastructure components.

At block 204, the cloud computing user generates, via the client system, a configuration for managing remote attestation of the one or more infrastructure components. In one embodiment, the cloud computing user can specify for the configuration which attributes should be used for generating an attestation policy for each of the infrastructure components. In one embodiment, the cloud computing user can use interface 400 depicted in FIG. 4 to generate the attestation policy metadata. As shown in this reference example, the user interface 400 includes an attribute panel 402 and a management panel 450. The user interface 400 generally allows a cloud computing user to identify infrastructure component(s) hosted within a cloud computing environment and manage attributes, configuration(s), settings, etc. of the infrastructure component(s).

The attribute panel 402, for example, generally allows a user to select which attributes of an infrastructure component should be considered when generating an attestation policy for that infrastructure component. The attribute panel 402 includes a list of attributes 404 and an order list 406 for the attributes 404. The attribute panel 402 also includes an infrastructure component selection box 470, which allows the user to select the infrastructure component(s) are going to be configured, e.g., using the attribute panel 402. In one embodiment, the attribute panel 402 allows the user to specify the universal set of attributes. As noted above, for a computing instance, such attributes can include attributes related to CPU registers, CPU configuration(s), peripheral hardware, BIOS settings, secure boot hashes, disk volumes, hypervisor configurations, host OS configurations/binaries, VM configurations/binaries, software configuration/binaries, etc. The attribute panel 402 may also allow a user to specify an attestation policy type indicating which number of the attributes should be selected and/or the order in which the number of attributes should be used. For example, a cloud computing user can select "Add All" prompt 408 to select all of the attributes. In another example, the cloud computing user can select "Add Selected" prompt 410 to use the attributes that have been selected within the attribute panel 402. In yet another example, the cloud computing user can select "Add Random" prompt 412 to use a random (sub)set of attributes within the attribute panel 402. The cloud computing user may also modify the ordering of attributes via the order list 406.

The management panel 450 generally allows a cloud computing user to manage when (e.g., the conditions) validation and/or rotation is to be performed for the attestation policies of the infrastructure components. As shown, the management panel 450 includes a rotation configuration 434 and a validation configuration 436. The rotation configuration 434 generally specifies the conditions for changing the attestation policy for each infrastructure component. Here, a cloud computing user can choose to rotate an attestation policy for an infrastructure component on a periodic basis (e.g., hourly, daily, weekly, or some other time frame) by selecting periodic option 440) or on a trigger-basis (e.g., receive an indication that a security event has occurred) by selecting trigger-based option 442.

The validation configuration 436 generally specifies the conditions under which an attestation policy for an infrastructure component should be validated by a remote attester 102. Here, a cloud computing user can choose to validate an attestation policy for an infrastructure component on a periodic basis (e.g., hourly, daily, or some other time frame) by selecting periodic option 444 and/or selecting event-based options (e.g., code deployment 446, incoming request 448, etc.). The cloud computing user can select "Add/Update" prompt 456 to update the rotation and/or validation configuration for one or more infrastructure components.

Referring back to FIG. 2, at block 206, the cloud computing user transmits, via the client system, the configuration to the remote attester 102 to trigger generation of an attestation policy for each of the one or more infrastructure components. In one embodiment, once the cloud computing user has selected the attributes, attestation policy type, rotation criteria, and/or validation criteria, the cloud computing user can select "Generate Attestation Policy Metadata" prompt 432 to send the attestation policy metadata to the remote attester 102.

Figure 3:
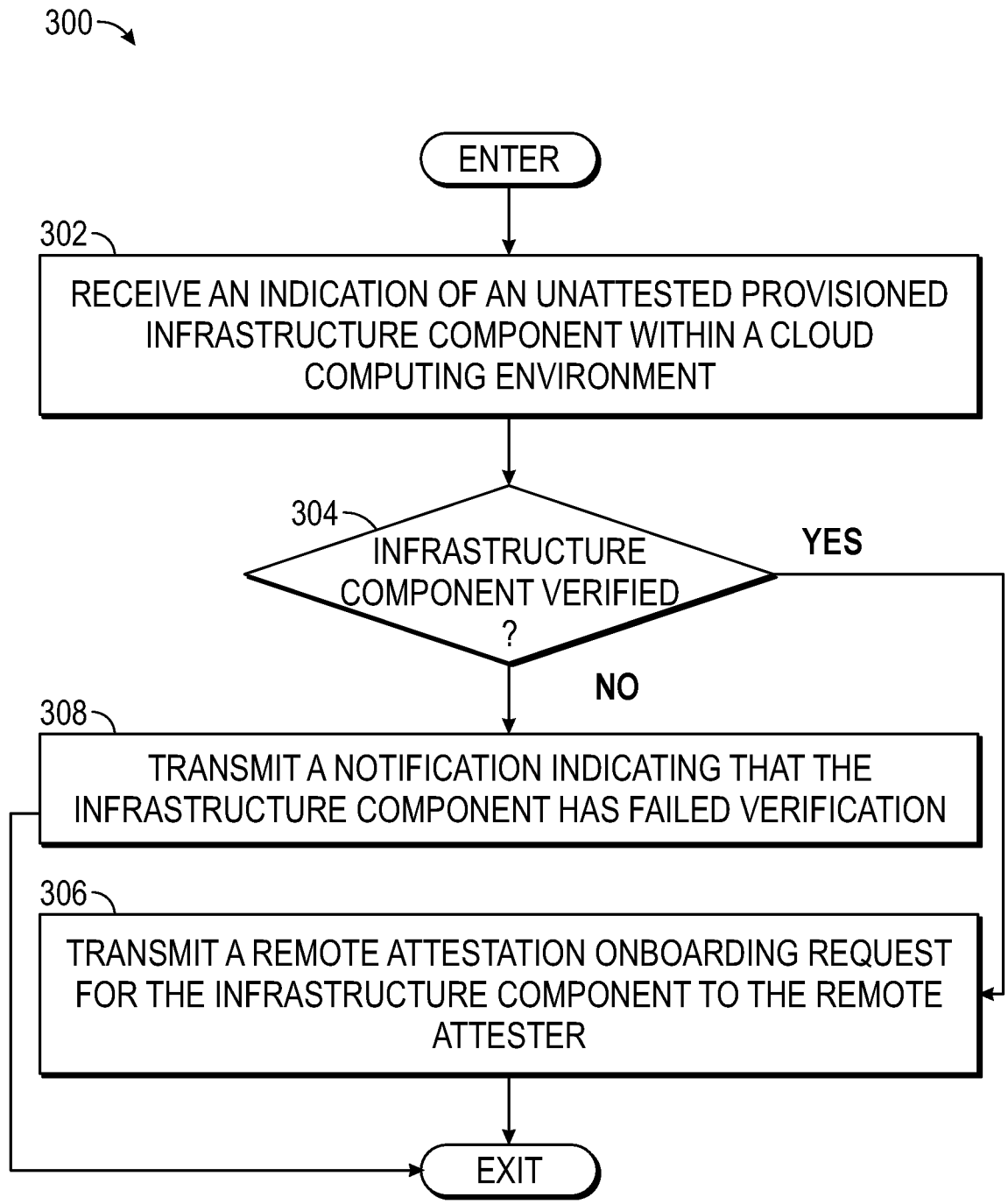
FIG. 3 is a flowchart of another method for managing remote attestation of infrastructure components hosted in a cloud computing environment, according to one embodiment.

FIG. 3 is a flowchart of a method 300 for managing remote attestation of infrastructure components hosted in a cloud computing environment, according to one embodiment. The method 300 may be performed by a cloud computing user, e.g., via one or more components (e.g., application 106, web browser 108) of a client system (e.g., client system 104).

Method 300 may enter at block 302, where the cloud computing user receives (via the client system) an indication of an (new) unattested provisioned infrastructure component within the cloud computing environment. For example, when an infrastructure component (e.g., computing instance) is initially (or newly) provisioned, it is generally unattested by default. At block 304, the cloud computing user determines whether the infrastructure component is verified. In one embodiment, the cloud computing user can access the infrastructure component (e.g., by logging into the infrastructure component) and perform one or more operations, e.g., to verify the (newly provisioned) infrastructure component. As shown in FIG. 4, for example, the cloud computing user can access unverified resources in the cloud computing environment and attributes of the unverified resources via the unverified infrastructure components panel 426 within the infrastructure component panel 424. In one embodiment, the cloud computing user can select "Verify" prompt 430 when satisfied with verification of the unverified infrastructure component(s).

If the infrastructure component is verified (e.g., the cloud computing user is satisfied with the verification operations), then the cloud computing user can generate and transmit a remote attestation on-boarding request for the infrastructure component to the remote attester 102 (block 306). On the other hand, if the infrastructure component is unverified, then the cloud computing user can transmit a notification (e.g., to the cloud computing environment 120) indicating that the infrastructure component has failed verification.

In one embodiment, the remote attestation onboarding request triggers the remote attester 102 to generate an attestation policy 152 at run-time for the infrastructure component using the cloud computing user's configured attestation policy metadata 150. The remote attester 102 can leverage mutual authentication over TLS or another secure transmission layer for secure transmission of the attestation policy 152 to the attestation agent 122 associated with the infrastructure component. For example, the remote attester 102 can encrypt the attestation policy 152 using the public key from the infrastructure component's certificate and sign it using the remote attester's 102 private key.

During provisioning, the attestation agent 122 upon receiving the on-boarding request can validate the request (e.g., verifying its authenticity, integrity, etc.) and generate an attestation policy cryptographic hash 154 based on the attestation policy. The attestation agent 122 can then return an encrypted and signed attestation policy cryptographic hash 154 back to the remote attester 102. The remote attester 102 can validate the response (e.g., verifying its authenticity, integrity, etc.) and store the attestation policy 152 along with the attestation policy cryptographic hash 154 into the attestation policy storage 114.

Figure 5:
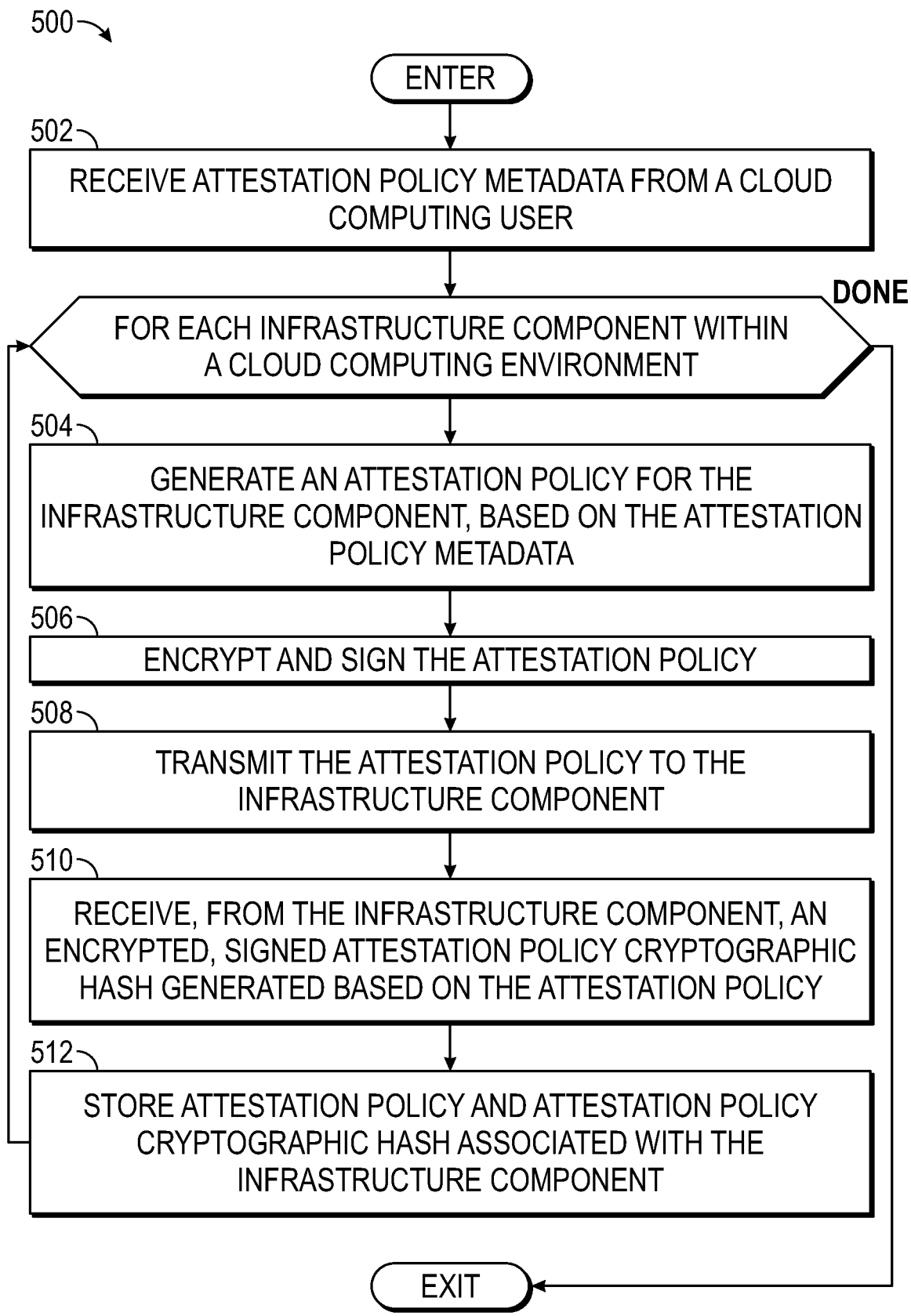
FIG. 5 is a flowchart of a method for generating an attestation policy to manage remote attestation of infrastructure components in a cloud computing environment, according to one embodiment.

FIG. 5 is a flowchart of a method 500 for generating an attestation policy to manage remote attestation of infrastructure components in a cloud computing environment, according to one embodiment. The method 500 may be performed by one or more components of the remote attester (e.g., remote attester 102).

Method 500 may enter at block 502, where the remote attester receives attestation policy metadata (e.g., attestation policy metadata 150) from a cloud computing user. After receiving attestation policy metadata, the remote attester performs blocks 504-512 for each infrastructure component within a cloud computing environment. At block 504, the remote attester generates an attestation policy (e.g., attestation policy 152) for the infrastructure component, based on the attestation policy metadata.

At block 506, the remote attester encrypts and signs the attestation policy. At block 508, the remote attester transmits the attestation policy to the infrastructure component. At block 510, the remote attester receives, from the infrastructure component, an encrypted, signed attestation policy cryptographic hash (e.g., cryptographic hash 154) (also referred to as authentication information) generated based on the attestation policy. At block 512, the remote attester stores the attestation policy and attestation policy cryptographic hash associated with the infrastructure component.

Figure 6:
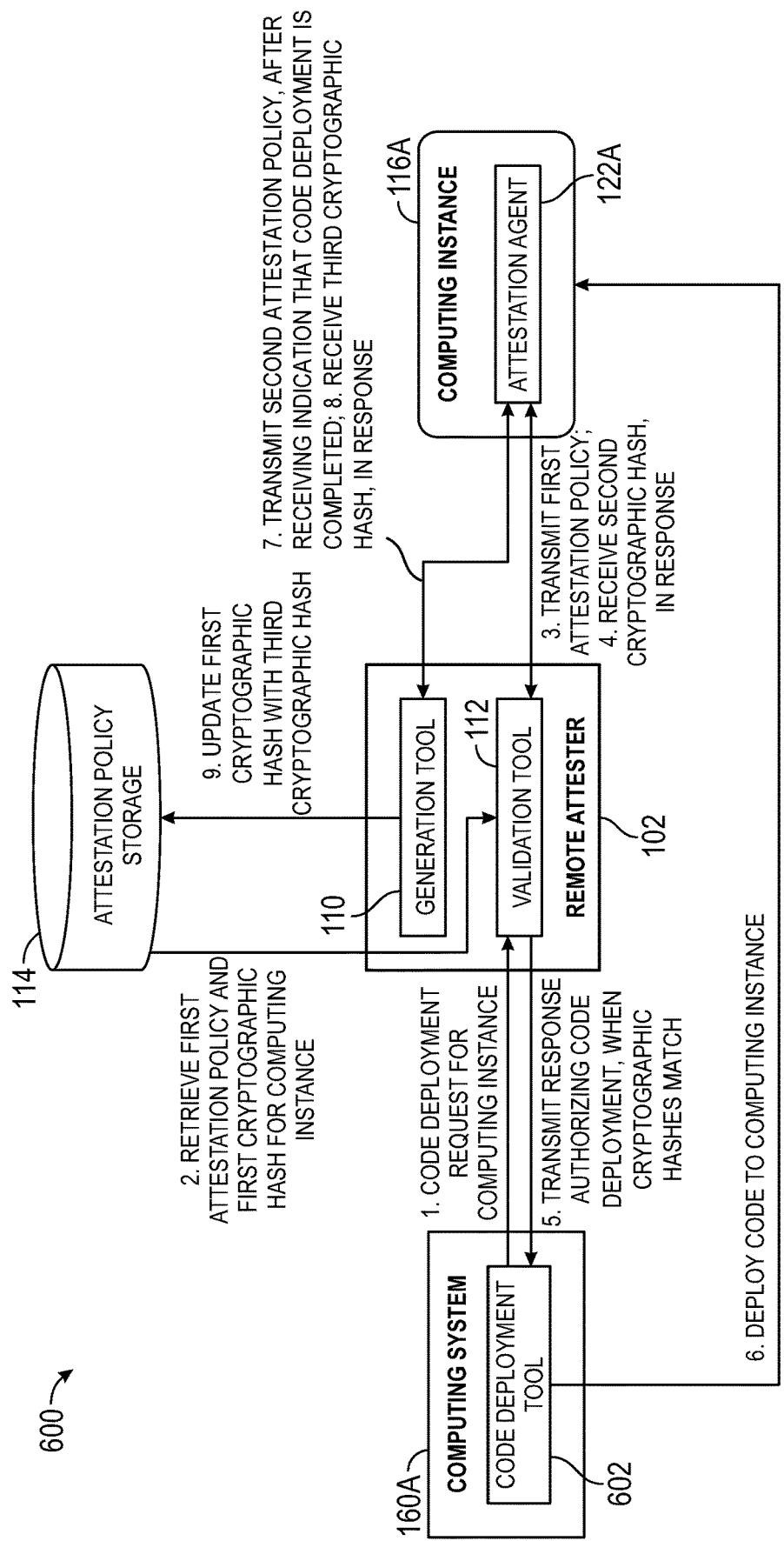
FIG. 6 illustrates a workflow for validating an attestation policy for an infrastructure component prior to code deployment to the infrastructure component, according to one embodiment.

FIG. 6 illustrates a workflow 600 for validating an attestation policy for an infrastructure component (e.g., a computing instance 116) prior to code deployment to the infrastructure component, according to one embodiment. As shown, the computing system 160A includes a code deployment tool 602, which is generally configured to deploy code to infrastructure components, e.g., to apply software updates, software patches, perform maintenance, etc.

In this embodiment, at step 1, the code deployment tool 602 sends a code deployment request for the computing instance 116A to the validation tool 112. Once received, the validation tool 112 can evaluate the attestation policy metadata to determine if a code deployment is one of the predetermined criteria for triggering a validation of the attestation policy for the computing instance 116A. If the validation tool 112 does determine that code deployment is one of the validation criteria, then the validation tool 112 retrieves the (first) current attestation policy and (first) cryptographic hash (e.g., first authentication information) associated with the computing instance 116A from attestation policy storage 114 (step 2). The validation tool 112 transmits the current attestation policy to the attestation agent 122A associated with the computing instance 116A (step 3), and receives, in response, a fresh computed cryptographic hash (e.g., second authentication information), based on the current attestation policy (step 4).

The validation tool 112 can compare the current cryptographic hash (from attestation policy storage) (e.g., first authentication information) with the fresh computed cryptographic hash (e.g., second authentication information) (received from the attestation agent 122A) to determine if there is match. If there is not a match, then validation tool 112 can flag the computing instance 116A, preventing further use of the computing instance 116A to execute workloads for the cloud computing user (e.g., the code deployment tool 602 would be prevented from deploying code to the computing instance 116A). As described below, in some embodiments, the flagging of the computing instance 116A may prompt the cloud computing user to update the attestation policy metadata for computing instance 116A (e.g., by removing certain attributes, adding certain attributes, changing criteria for rotation/validation, etc.). This, in turn, may trigger the remote attester 102 to generate another attestation policy for the computing instance 116A, based on the updated attestation policy metadata. On the other hand, if there is a match, then the validation tool 112 can authorize the code deployment (step 5), prompting the code deployment tool 602 to deploy code to the computing instance 116A (step 6).

Once the code installation is complete (e.g., after the code has been deployed), the attestation agent 122A can send an indication that code deployment is completed to the generation tool 110 (step 7). Once the indication is received, the generation tool 110 can transmit a second attestation policy to the attestation agent 122A to trigger generation of a third cryptographic hash (e.g., third authentication information) (step 7). Note that, in some embodiments, the second attestation policy that is transmitted (e.g., in step 7) may be the same as the first attestation policy that is retrieved from the attestation policy storage 114 (e.g., in step 2). In other embodiments, the second attestation policy that is transmitted (e.g., in step 7) may be different than the first attestation policy that is retrieved from the attestation policy storage 114 (e.g., in step 2). In these embodiments, the remote attester 102 may have generated a different attestation policy based on updated attestation policy metadata 150 received from a cloud computing user.

As shown, the attestation agent 122A computes a new (third) cryptographic hash (e.g., third authentication information), using the attestation policy received in step 7, and transmits the new (third) cryptographic hash to the generation tool 110 (step 8). The generation tool 110 can validate the response (e.g., verifying authenticity, integrity, etc.) and update the current cryptographic hash to the new cryptographic hash within the attestation policy storage 114 (step 9).

Figure 7:
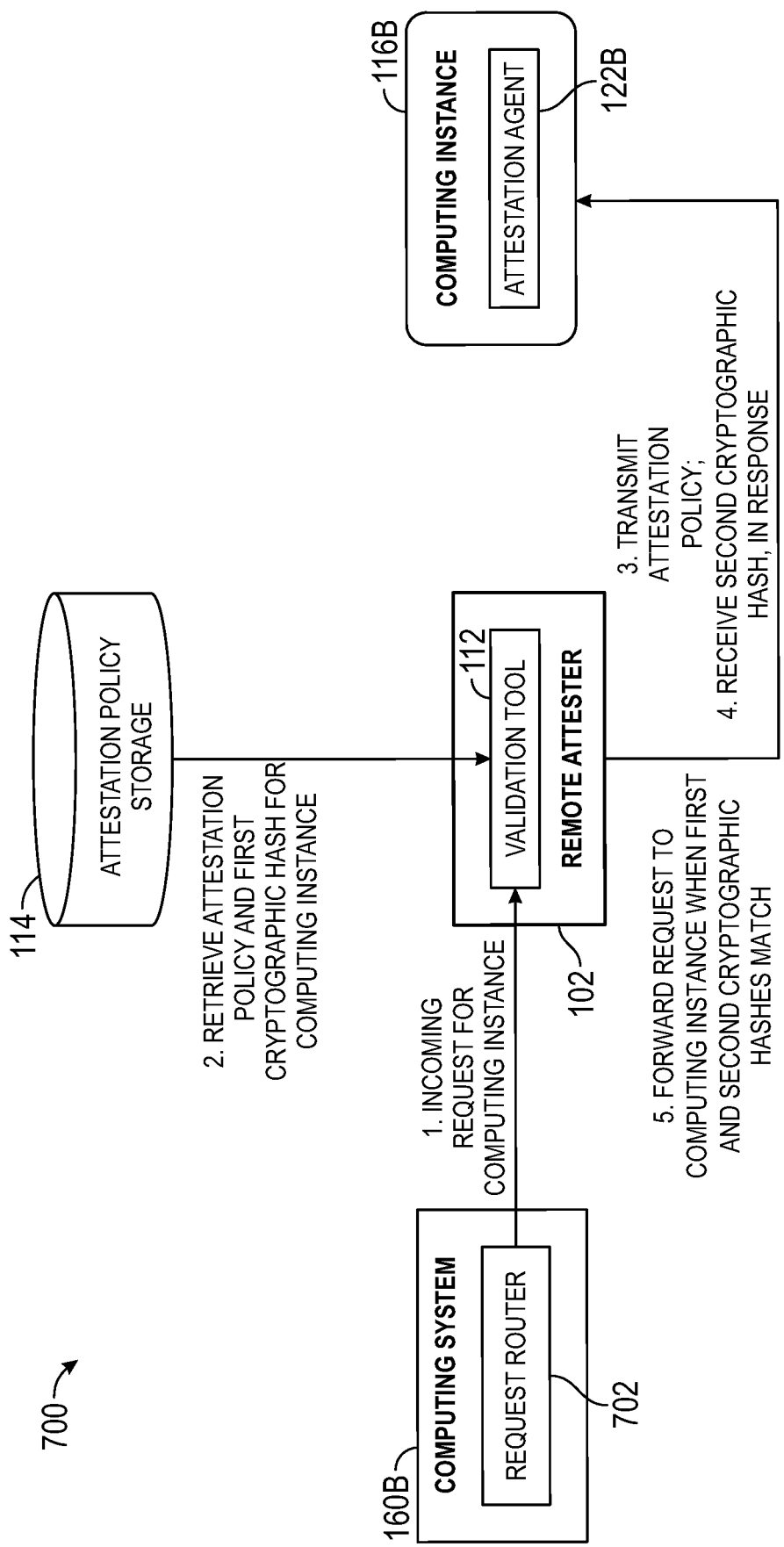
FIG. 7 illustrates a workflow for validating an attestation policy for an infrastructure component prior to routing an incoming request to the infrastructure component, according to one embodiment.

FIG. 7 illustrates a workflow 700 for validating an attestation policy for an infrastructure component (e.g., a computing instance 116B) prior to routing an incoming request (from a computing system) to the infrastructure component, according to one embodiment. As shown, the computing system 160B includes a request router 702, which is generally configured to route incoming requests to infrastructure components.

In this embodiment, at step 1, the request router 702 sends an incoming request to computing instance 116B that is intercepted by the validation tool 112. Upon receiving the incoming request, the validation tool 112 can evaluate the attestation policy metadata to determine if an incoming request is one of the predetermined criteria for triggering a validation of the attestation policy 152 for computing instance 116B. If the validation tool 112 does determine that an incoming request is one of the validation criteria, then the validation tool 112 retrieves the current attestation policy 152 and (first) cryptographic hash 154 (e.g., first authentication information) associated with the computing instance 116B from attestation policy storage 114 (step 2).

The validation tool 112 transmits the current attestation policy 152 to the attestation agent 122B associated with the computing instance 116B (step 3), and receives, in response, a fresh computed cryptographic hash 154 (e.g., second authentication information), based on the current attestation policy 152 (step 4). If the validation tool 112 determines that the cryptographic hashes match, then the validation tool 112 forwards the incoming request from the request router 702 to the computing instance 116B (step 5).

Figure 8:
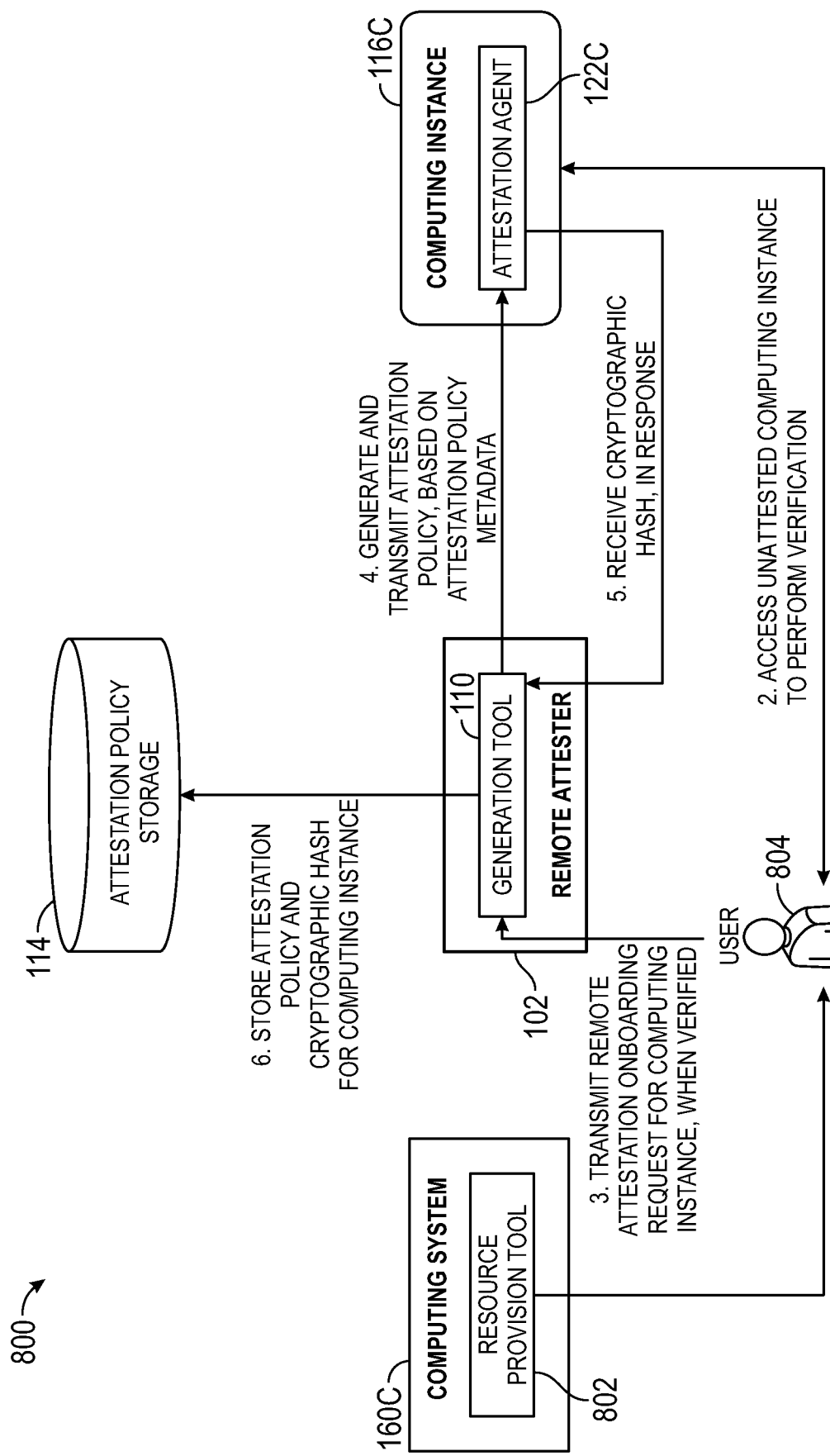
FIG. 8 illustrates a workflow for validating an unattested provisioned infrastructure component, according to one embodiment.

FIG. 8 illustrates a workflow 800 for validating an unattested provisioned infrastructure component (e.g., a computing instance 116C), according to one embodiment. As shown, the computing system 160C includes a resource provision tool 802, which is generally configured to provision unattested infrastructure components (e.g., computing instances).

Here, the resource provision tool 802 sends a notification of an unattested provisioned computing instance 116C to the cloud computing user 804, e.g., via client system 104 (step 1). At step 2, the cloud computing user 804 accesses the provisioned computing instance to perform verification. For example, in one embodiment, the cloud computing user 804 can verify the provisioned computing instance using infrastructure component panel 424 of user interface 400.

When the computing instance 116C is verified, the cloud computing user 804 transmits an onboarding request for the computing instance 116C to the generation tool 110 of the remote attester 102 (step 3). The generation tool 110, in response, generates an attestation policy 152 for the computing instance 116C, based on configured attestation policy metadata 150 received from the cloud computing user, and transmits the attestation policy 152 to the attestation agent 122C associated with the computing instance 116C (step 4). At step 5, the generation tool 110 receives a cryptographic hash 154, generated based on the attestation policy 152. At step 6, the generation tool 110 stores the attestation policy 152 and cryptographic hash 154 for the computing instance 116C (in association), e.g., in attestation policy storage 114.

Figure 9:
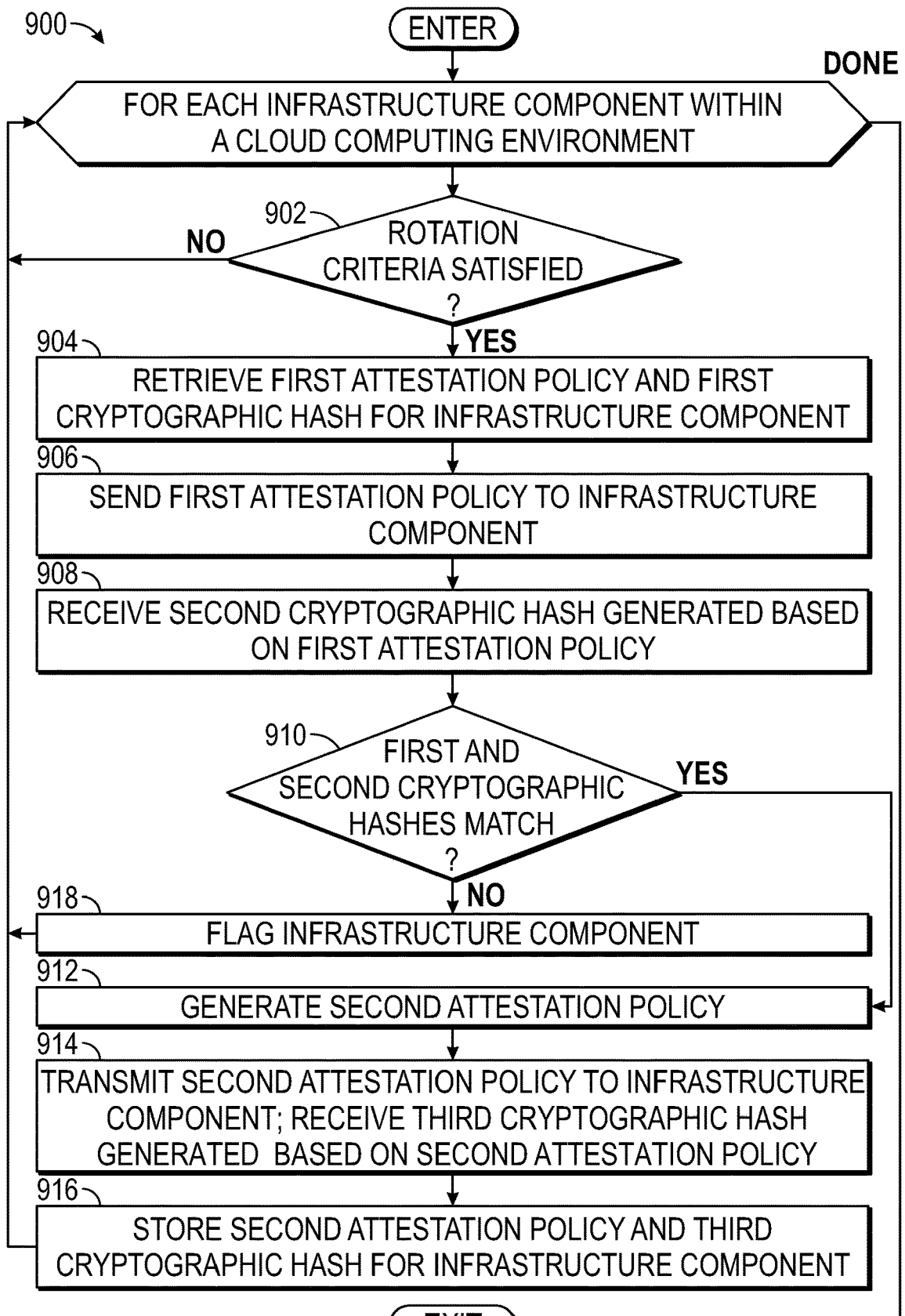
FIG. 9 is a flowchart of a method for managing rotation of an attestation policy for an infrastructure component in a cloud computing environment, according to one embodiment.

FIG. 9 is a flowchart of a method 900 for managing rotation of an attestation policy for an infrastructure component in a cloud computing environment, according to one embodiment. The method 900 may be performed by one or more components of the remote attester (e.g., remote attester 102).

Method 900 may enter at block 902, where the remote attester determines whether one or more rotation criteria is satisfied for an attestation policy of an infrastructure component (e.g., computing instance 116). In one example, the rotation criteria may include occurrence of a periodic time interval (e.g., the attestation policy metadata may indicate to rotate the attestation policy for the infrastructure component daily, weekly, etc.). In another example, the rotation criteria may include detection of a predetermined event (e.g., security breach, infrastructure component is compromised, etc.).

If the rotation criteria is not satisfied, then the method 900 proceeds to evaluate another infrastructure component. If the rotation criteria is satisfied, then the remote attester retrieves a first attestation policy and first cryptographic hash for the infrastructure component (e.g., from attestation policy storage 114) (block 904). At block 906, the remote attester sends the first attestation policy to the attestation agent (e.g., attestation agent 122) associated with the infrastructure component. At block 908, the remote attester receives a second (fresh) cryptographic hash generated based on the first attestation policy.

At block 910, the remote attester determines whether the first and second cryptographic hashes match. If the first and second cryptographic hashes do not match, then the remote attester flags the infrastructure component (block 918) and the method 900 proceeds to evaluate the next infrastructure component, if available. Although not shown, in some embodiments, flagging the infrastructure component may include sending a notification to a cloud computing user to prompt a review of the infrastructure component. In these embodiments, the cloud computing user can choose to update the attestation policy metadata for the infrastructure component. For example, the cloud computing user can log into the infrastructure component to analyze why the infrastructure component failed attestation. Based on the review, the cloud computing user can modify the selection of attributes for generating a new attestation policy for the infrastructure component, change criteria for rotating the new attestation policy (e.g., increasing the frequency of the rotation), change criteria for validating the new attestation policy, etc. On the other hand, if the first and second cryptographic hashes do match, then the remote attester generates a second attestation policy (block 912). The remote attester transmits the second attestation policy to the attestation agent associated with the infrastructure component, and receives a third cryptographic hash generated based on the second attestation policy (block 914). At block 916, the remote attester stores the second attestation policy and third cryptographic hash (in association) for the infrastructure component.

Figure 10:
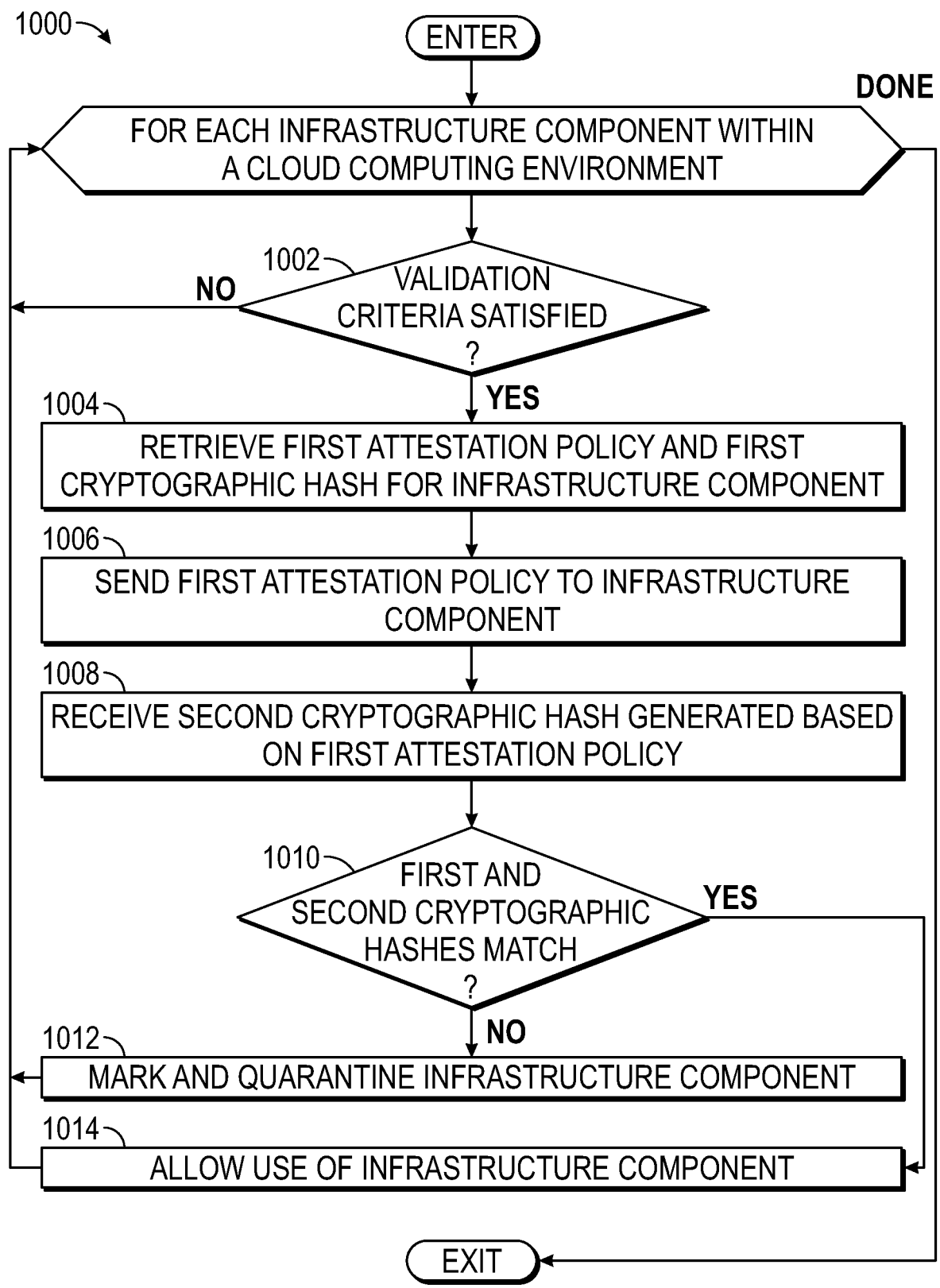
FIG. 10 is a flowchart of a method for managing validation of an attestation policy in a cloud computing environment, according to one embodiment.

FIG. 10 is a flowchart of a method 1000 for managing validation of an attestation policy for an infrastructure component in a cloud computing environment, according to one embodiment. The method 1000 may be performed by one or more components of the remote attester (e.g., remote attester 102).

Method 1000 may enter at block 1002, where the remote attester determines whether one or more validation criteria is satisfied for an attestation policy of an infrastructure component (e.g., computing instance 116). In one example, the validation criteria may include occurrence of a periodic time interval (e.g., the attestation policy metadata may indicate to validate the infrastructure component daily, weekly, etc.). In another example, the validation criteria may include detection of a predetermined trigger (or occurrence of a type of event), such as a request to access a particular infrastructure component. In some cases, the request to access a particular infrastructure component may be for code deployment to the infrastructure component, for an incoming processing request to the infrastructure component, etc.

If the validation criteria is not satisfied, then the method 1000 proceeds to evaluate another infrastructure component. If the validation criteria is satisfied, then the remote attester retrieves a first attestation policy and first cryptographic hash (e.g., first authentication information) for the infrastructure component (e.g., from attestation policy storage 114) (block 1004). At block 1006, the remote attester sends the first attestation policy to the attestation agent (e.g., attestation agent 122) associated with the infrastructure component. At block 1008, the remote attester receives a second (fresh) cryptographic hash (e.g., second authentication information) generated based on the first attestation policy.

At block 1010, the remote attester determines whether the first and second cryptographic hashes match. If the first and second cryptographic hashes do not match, then the remote attester marks and quarantines the infrastructure component for further review (e.g., by an administrator, the cloud computing user, etc.) (block 1012) and the method 1000 proceeds to evaluate the next infrastructure component, if available. This marking and/or quarantining of the infrastructure component makes the infrastructure component unsuitable for processing requests. In some embodiments, in response to determining that the cryptographic hashes do not match, the remote attester may generate and transmit a message indicating that access to the particular infrastructure component is denied.

Additionally, as noted above, although not shown, in some embodiments, the operations in block 1012 may prompt a cloud computing user to update the attestation policy metadata for the infrastructure component. The updated attestation policy metadata, in turn, can trigger the remote attester to generate a new attestation policy for the infrastructure component. On the other hand, if the first and second cryptographic hashes do match, then the remote attester allows use of the infrastructure component (block 1014), and the method 1000 proceeds to evaluate the next infrastructure component, if available. In some embodiments, in response to determining that the cryptographic hashes do match, the remote attester may generate and transmit a message indicating that access to the particular infrastructure component is granted.

Figure 11:
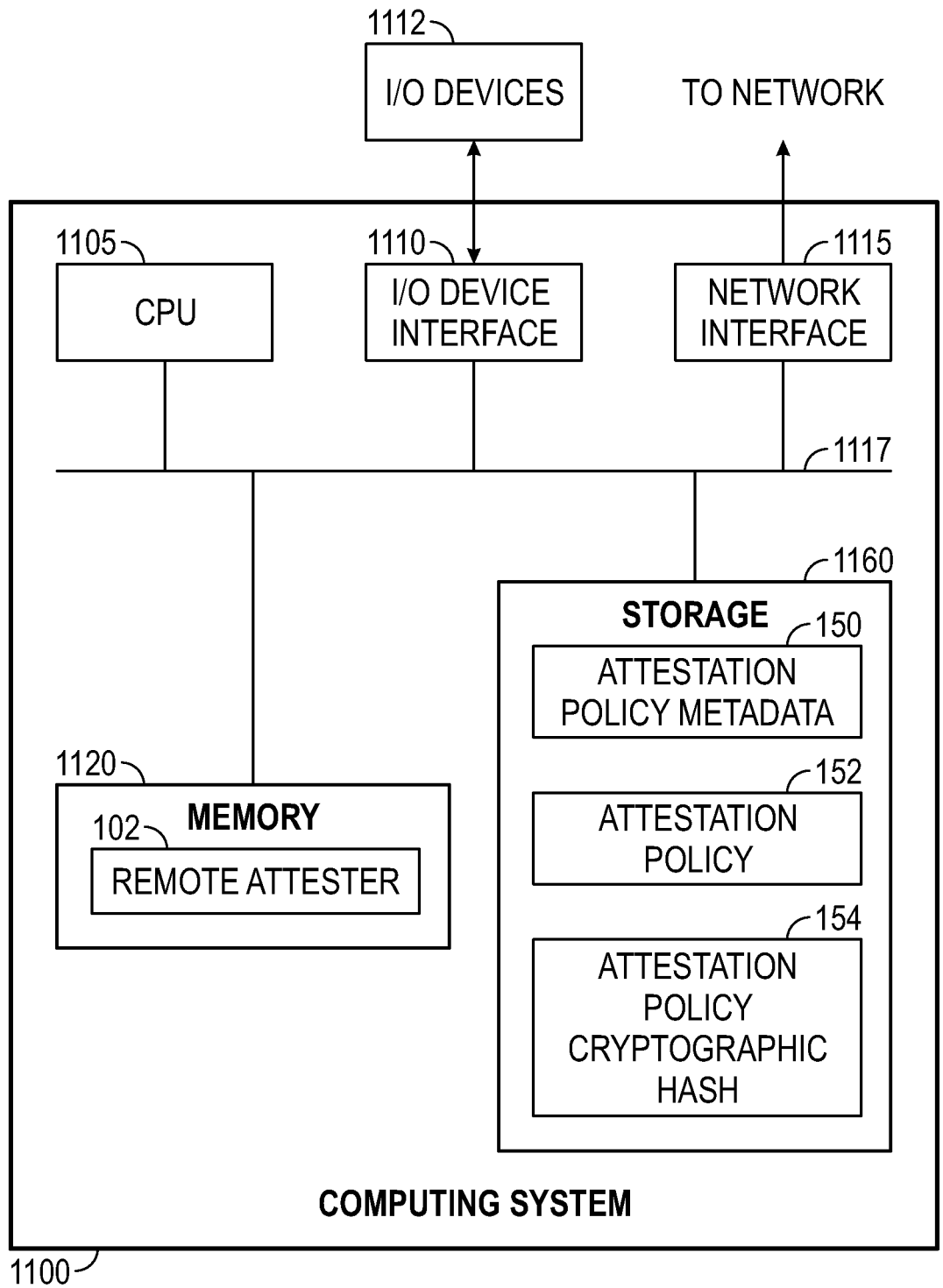
FIG. 11 illustrates a computing system configured to manage remote attestation of infrastructure components hosted in a cloud computing environment, according to one embodiment.

FIG. 11 illustrates a computing system 1100 configured to manage remote attestation of infrastructure components hosted in a cloud computing environment, according to one embodiment. As shown, the computing system 1100 includes, without limitation, a central processing unit (CPU) 1105, a network interface 1115, a memory 1120, and storage 1160, each connected to a bus 1117. The computing system 1100 may also include an I/O device interface 1110 connecting I/O devices 1112 (e.g., keyboard, mouse, and display devices) to the computing system 1100. Further, in context of this disclosure, the computing elements shown in the computing system 1100 may correspond to a physical computing system (e.g., a system in a data center) or may be a virtual computing instance executing within a computing cloud.

The CPU 1105 retrieves and executes programming instructions stored in the memory 1120 as well as stores and retrieves application data residing in the memory 1120. The interconnect 1117 is used to transmit programming instructions and application data between CPU 1105, I/O devices interface 1110, storage 1160, network interface 1115, and memory 1120. Note CPU 1105 is included to be representative of a single CPU, multiple CPUs, a single CPU having multiple processing cores, and the like. Memory 1120 is generally included to be representative of a random access memory. The storage 1160 may be a disk drive storage device. Although shown as a single unit, storage 1160 may be a combination of fixed and/or removable storage devices, such as fixed disc drives, removable memory cards, or optical storage, network attached storage (NAS), or a storage area-network (SAN). The storage 1160 includes attestation policy metadata 150, attestation policy 152, and attestation policy cryptographic hash 154, all of which are described in more detail above. Illustratively, the memory 1120 includes the remote attester 102, which is described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., remote attester 102, attestation policy storage 114, attestation agent(s) 122, infrastructure components, etc.) or related data available in the cloud. For example, the remote attester 102 (or other component(s)/modules discussed herein could execute on a computing system in the cloud, and receive attestation policy metadata from a cloud computing user for managing remote attestation of infrastructure components hosted in the cloud. In such a case, the remote attester 102 could generate an attestation policy, based on the attestation policy metadata, and store the attestation policy in a storage location in the cloud. The attestation policy can be later retrieved and used to validate the infrastructure components. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A remote attestation system comprising:
a computing instance hosted in a cloud computing environment, wherein the computing instance, in accordance with an attestation policy for the computing instance generated based on a user-specified configuration received from a client device associated with a user, has generated first authentication information for the computing instance, wherein the user-specified configuration specifies a plurality of attributes associated with the computing instance and a manner for using the plurality of attributes to generate the attestation policy for the computing instance, and wherein the attestation policy indicates which attributes of a plurality of attributes specified in the user-specified configuration were used to generate the first authentication information;
a data repository comprising the attestation policy and the first authentication information for the computing instance; and
one or more processors in communication with the data repository, wherein the one or more processors are programmed with specific computer-executable instructions to perform operations comprising:
receiving, from the client device, a request to access the computing instance hosted in the cloud computing environment;
retrieving, from the data repository in response to the request, (i) the attestation policy for the computing instance and (ii) the first authentication information for the computing instance;
transmitting the attestation policy to the computing instance;
receiving, from the computing instance, second authentication information generated by the computing instance in accordance with the attestation policy that is transmitted to the computing device;
performing, in response to the request to access the computing instance, an attestation of the computing instance, wherein performing the attestation comprises:
comparing the first authentication information retrieved from the data repository with the second authentication information received from the computing instance; and
determining that the first authentication information corresponds to the second authentication information; and
processing the request to access the computing instance, based on the-attestation.

2. The remote attestation system of claim 1, wherein to process the request to access the computing instance, the one or more processors are programmed with further specific computer-executable instructions to perform the operations of:
transmitting a message indicating that access to the computing instance is granted.

3. The remote attestation system of claim 2, wherein the request to access the computing instance is associated with a request to deploy software to the computing instance, and wherein the one or more processors are programmed with further specific computer-executable instructions to perform operations comprising:

receiving, from the computing instance, third authentication information generated in accordance with the attestation policy after the software has been deployed to the computing instance; and storing the attestation policy in association with the third authentication information in the data repository.

4. The remote attestation system of claim 2, wherein the request to access the computing instance is associated with an incoming processing request to the computing instance.

5. The remote attestation system of claim 3, wherein to process the request to access the computing instance, the one or more processors are programmed with further specific computer-executable instructions to perform the operations of:

determining that the third authentication information does not correspond to the first authentication information; and transmitting a message indicating that access to the computing instance is denied.

6. A computer-implemented method comprising:

receiving, from a client device associated with a user, a user-specified configuration for generating a remote attestation policy for an infrastructure component hosted in a cloud computing environment, the user-specified configuration specifying a plurality of attributes associated with the infrastructure component and a manner for using the plurality of attributes to generate an attestation policy for the infrastructure component;

generating the attestation policy for the infrastructure component, wherein the attestation policy generated for the infrastructure component indicates, in accordance with the manner for using the plurality of attributes that is specified in the user-specified configuration, which of the plurality of attributes specified in the user-specified configuration to use during remote attestation of the infrastructure component;

transmitting, to the infrastructure component, the attestation policy generated for the infrastructure component;

receiving, from the infrastructure component, first authentication information for the attestation policy;

storing the attestation policy in a data repository;

storing the first authentication information in association with the attestation policy in the data repository;

receiving, from the client device, a request to access the infrastructure component;

in response to a request made of the infrastructure component, performing a remote attestation of the infrastructure component in accordance with the attestation policy generated for the infrastructure component and for which the first authentication information was received; wherein performing the remote attestation comprises:

retrieving, from the data repository, (i) the attestation policy for the infrastructure component and (ii) the first authentication information for the infrastructure component;

transmitting the attestation policy to the infrastructure component;

receiving, from the infrastructure component, second authentication information generated by the infrastructure component in accordance with the attestation policy that is transmitted to the infrastructure component;

comparing the first authentication information retrieved from the data repository with the second authentication information received from the infrastructure component; and determining that the first authentication information corresponds to the second authentication information; and processing the request made of the infrastructure component, based on the remote attestation.

7. The computer-implemented method of claim 6, wherein the user-specified configuration further indicates at least one of a first criterion for selecting which of the plurality of attributes to use during the remote attestation of the infrastructure component and a second criterion for ordering which of the plurality of attributes are selected.

8. The computer-implemented method of claim 7, wherein the first criterion comprises: (i) all of the plurality of attributes; (ii) a randomized subset of the plurality of attributes; or (iii) a subset of the plurality of attributes selected based on a machine learning model.

9. The computer-implemented method of claim 6, wherein the user-specified configuration further indicates a criterion for updating the attestation policy for the infrastructure component.

10. The computer-implemented method of claim 9, wherein the criterion comprises: (i) a periodic time interval or (ii) occurrence of a condition.

11. The computer-implemented method of claim 9, further comprising:

determining that the criterion is satisfied;

receiving third authentication information from the infrastructure component, wherein the third authentication information is generated in accordance with the attestation policy; and determining that the first authentication information corresponds to the third authentication information:

generating a second attestation policy for the infrastructure component; transmitting the second attestation policy to the infrastructure component;

receiving, in response to the second attestation policy, fourth authentication information from the infrastructure component, wherein the fourth authentication information is generated in accordance with the second attestation policy; and storing the fourth authentication information in association with the second attestation policy for the infrastructure component.

12. The computer-implemented method of claim 6, wherein the user-specified configuration further indicates a criterion for validating the attestation policy for the infrastructure component.

13. The computer-implemented method of claim 12, further comprising:

determining that the criterion is satisfied;

receiving third authentication information from the infrastructure component, wherein the third authentication information is generated in accordance with the attestation policy;

determining that the first authentication information does not correspond to the third authentication information; and marking the infrastructure component as unsuitable for processing requests.

14. The computer-implemented method of claim 12, wherein the criterion comprises: (i) a periodic time interval or (ii) occurrence of a type of event.

15. The computer-implemented method of claim 14, wherein the type of event comprises at least one of receiving a request to deploy software to the infrastructure component or receiving an incoming processing request for the infrastructure component.

16. A system comprising:
a memory to store specific computer-executable instructions; and
one or more processors in communication with the memory, wherein the one or more processors execute the specific computer-executable instructions stored in memory to:
receive, from a client device associated with a user, a user-specified configuration for generating a remote attestation policy for an infrastructure component, the user-specified configuration specifying a plurality of attributes associated with the infrastructure component and a manner for using the plurality of attributes to generate an attestation policy for the infrastructure component;
generate the attestation policy for the infrastructure component from the user-specified configuration, wherein the attestation policy that is generated specifies, in accordance with the manner for using the plurality of attributes that is specified in the user-specified configuration, which attributes of the plurality of attributes to use during attestation of the infrastructure component;
transmit, to the infrastructure component, the attestation policy generated for the infrastructure component;
receive, from the infrastructure component, first authentication information for the attestation policy;
store the attestation policy in a data repository;
store the first authentication information in association with the attestation policy in the data repository;
intercept a request transmitted to the infrastructure component;
perform an attestation of the infrastructure component using the attributes specified in the attestation policy generated for the infrastructure component and for which the first authentication information was received, wherein performing the attestation comprises:
retrieving, from the data repository, (i) the attestation policy for the infrastructure component; and (ii) the first authentication information for the infrastructure component;
transmitting the attestation policy to the infrastructure component;
receiving, from the infrastructure component, second authentication information generated by the infrastructure component in accordance with the attestation policy;
comparing the first authentication information with the second authentication information; and
determining that the first authentication information corresponds to the second authentication information; and
processing the request, based on the attestation of the infrastructure component.

17. The system of claim 16, wherein to generate the attestation policy, the one or more processors execute further specific computer-executable instructions to: receive, from the client device, at least one of: (i) a set of attributes associated with the infrastructure component; (ii) an indication of a first criterion for selecting an attribute of the plurality of attributes for generation of the attestation policy; (iii) an indication of a second criterion for updating the attestation policy for the infrastructure component; and (iv) an indication of a third criterion for validating the attestation policy for the infrastructure component.

18. The system of claim 16, wherein the infrastructure component comprises a newly provisioned infrastructure component, and wherein the newly provisioned infrastructure component is unattested.

19. The system of claim 18, the one or more processors execute further specific computer-executable instructions to:
receive from the client device an indication that the newly provisioned infrastructure component has been verified; and
transmit in response to the indication, a request to perform remote attestation for the newly provisioned infrastructure component.

* * * * *